(12) United States Patent
Willinger

(10) Patent No.: US 7,513,991 B1
(45) Date of Patent: Apr. 7, 2009

(54) AQUARIUM FILTER INDICATOR

(75) Inventor: Jonathan Willinger, Tenafly, NJ (US)

(73) Assignee: J.W. Pet Company, Inc., Teterbor, NJ (US)

( * ) Notice: Subject to any disclaimer, the term of this patent is extended or adjusted under 35 U.S.C. 154(b) by 623 days.

(21) Appl. No.: 11/211,152

(22) Filed: Aug. 24, 2005

Related U.S. Application Data

(60) Provisional application No. 60/604,114, filed on Aug. 24, 2004.

(51) Int. Cl.
B01D 35/143 (2006.01)

(52) U.S. Cl. .............................. 210/86; 73/306; 73/323; 73/866.5; 116/228; 116/283; 119/259; 210/121; 210/129; 210/167.25

(58) Field of Classification Search .................. 210/85, 210/86, 91, 121, 169.21, 169.25, 169.27, 210/416.2, 94, 167.21, 167.25, 167.27, 128, 210/129, 464, 474; 116/228, 281, 283; 119/259; 73/305, 306, 309, 323, 866.5
See application file for complete search history.

(56) References Cited

U.S. PATENT DOCUMENTS 3,720,317 A * 3/1973 Willinger ..................... 210/94
3,746,168 A * 7/1973 Willinger et al. .............. 210/87
4,220,530 A * 9/1980 Gabriele ....................... 210/86
4,285,813 A * 8/1981 Stewart et al. ......... 210/167.25
5,084,164 A * 1/1992 Del Rosario .................. 210/94
5,246,571 A * 9/1993 Woltmann .................... 210/86
6,287,458 B1 * 9/2001 Lawrence .................... 210/91
6,375,833 B1 * 4/2002 Marston et al. ............... 210/85
2006/0112832 A1 * 6/2006 Barraclough et al. .......... 99/276

* cited by examiner

Primary Examiner—Joseph W Drodge
(74) Attorney, Agent, or Firm—Katten Muchin Rosenman LLP

(57) ABSTRACT

A clogging indicator for a fish tank or aquarium comprising a transparent vertical tube with a float positioned therein. The indicator is designed to sit on the outside of the tank and the filter itself. The water level in the tube is lowered and raised according to the amount of water with a rear chamber of the filter. Indicating marks are located on the tube to visually display normal or clogged operation. Backup water from a clogged filter will raise the water level in the rear chamber and thus also the indicator tube. As the water level rises, the float raises toward a warning indicator mark to indicate the need for filter changing.

7 Claims, 1 Drawing Sheet

AQUARIUM FILTER INDICATOR

RELATED APPLICATIONS

This application claims priority under 35 U.S.C. 119 (e) from U.S. Ser. No. 60/604,114 filed on Aug. 24, 2004 and which is hereby incorporated by reference in its entirety for all purposes.

BACKGROUND OF THE INVENTION

1. Field of Invention

The present invention relates generally to the field of aquarium filters. More specifically, the present invention is related to an indicating device for an aquarium filter.

2. Discussion of Prior Art

Filtering assemblies are provided in fish tanks and aquariums to process waste and impurities and clean the water passing through. Typically, water is drained into the intake of a filter's rear chamber from the tank through a siphon. The water is then pumped from the rear chamber through a filter medium (e.g., charcoal, sponges) into a forward chamber. The forward chamber may use a spillway to allow the clean water to flow back into the tank.

The filter medium gets clogged due to impurities, debris, and the like. Water is then slowed in passing from the back chamber through the filter medium, thus allowing the level of water in the back chamber to build up. A device that visually displays blocking or clogging of a filter enables a user to correct the problem before damage occurs such as overflowing the filter.

Prior art devices for filter clogging are primarily used within the filter and are not provided externally from the filter or tank. A device comprising a tube with a float for indicating clogs mounted externally with respect to the filter such that it sits outside the filter and tank would be beneficial.

The following references represent examples of the prior art:

U.S. Pat. No. 4,220,530 illustrates an indicator on an aquarium filter, which rises and falls based upon the water level indicating clogging in passageways. However, the clogging indicator is provided within the chambers of the filter and does not utilize a float in a tube.

U.S. Pat. No. 4,285,813 discusses an indicating portion that is used on the back of an underside cover of a filter housing. The use of a tube comprising a float that is external to the filter device is not described.

U.S. Pat. No. 5,246,571, on the other hand, comprises a parallel tube providing an indicator. The device, however, is provided within the filter and does not discuss the use of a float to indicate clogging.

Also, U.S. Pat. No. 3,720,317 describes the use of a floating ball in a filtering device. The housing, however, comprises two chambers within the filter, and does not include a separate, external tube.

The following references describe the use of a tube and float in a tank:

The general use of a float in a tube providing an indicator for use inside a septic tank is shown in U.S. Pat. No. 6,440,304. Similarly, U.S. Pat. No. 6,277,280 illustrates a septic tank container within a septic tank comprising an indication device. However, neither is used in an aquarium filter to indicate clogs.

U.S. Pat. No. 4,998,228 shows a portable, transparent tube and float as part of a water filtration system. However, the described indication device moves through a non-gaseous fluid with different specific gravity and it is not provided for use in an aquarium filter.

Additional types of filtration systems are described in U.S. Pat. Nos. 3,746,168, 3,746,169, 6,287,456, and 6,375,833. The '168 and '169 patents disclose a partition in the filter housing with a rotary device for signaling the rate of inflow of water. The '456 and '833 patents also describe methods of indicating water flow that use valves within filter assemblies. U.S. Pat. No. 2,638,581 describes a device showing the water level in a general filtering device. The device, however, operates using a spring-loaded valve.

Whatever the precise merits, features, and advantages of the above cited references, none of them achieves or fulfills the purposes of the present invention.

SUMMARY OF THE INVENTION

An indicator is provided on the part of an aquarium filter that sits outside of a fish tank to indicate clogging of the rear chamber of the filter. The indicator comprises a transparent, vertical tube that receives water from the rear chamber of the filter through a slot or opening. A float is positioned within the tube to operatively move as the water level rises and lowers in the rear chamber of the filter. Indication marks are provide on the tube to visually display a normal or clogged operation according the water level and the float. As the filter clogs, water rises in the rear chamber and tube. The float then rises to a warning indicator mark to indicate the possible clogging and needed filter changing.

DESCRIPTION OF THE PREFERRED EMBODIMENTS

Figure 1A:
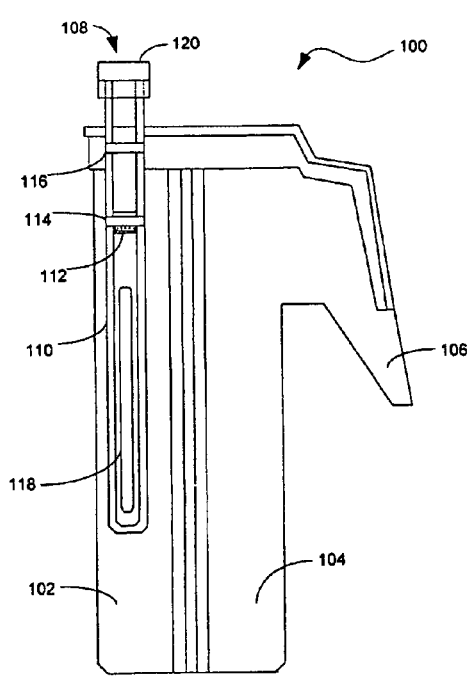
FIG. 1a illustrates a side view of a filter with the indicating device at a normal water level.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 1B:
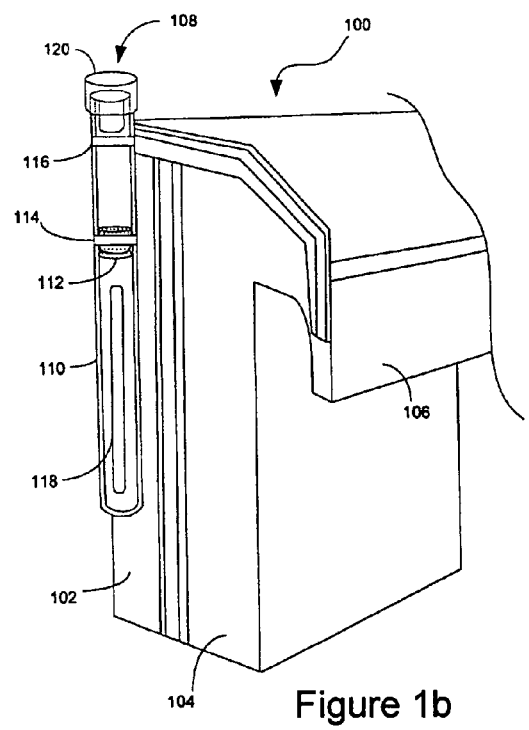
FIG. 1b illustrates a perspective view of a filter with the indicating device at a normal water level.

FIGS. 1a and 1b illustrate a filter device 100 used on a fish tank or aquarium (not shown). Filter 100 generally comprises rear chamber 102 and front chamber 104. Water is brought in from the tank (not shown) into the intake of a filter's rear chamber 102 through a siphon or pump. The water then passes through a filter medium (not shown) into front chamber 104. Front chamber 104 uses a sloping spill-way 106 allowing the now clean water to enter back into the tank.

Present invention indicator 108 is external to filter 100. Particularly, indicator 108 is designed to sit on the outside of filter 100, thus on the outside of the tank, and is parallel with rear chamber 102 of filter 100. Indicator 108 may be integrally molded with or attached to the filter using known methods and materials. It should be noted that although the figures indicate the use of indicator 108 on the side of the filter, it may be placed at any location with respect to the filter as long as the water level is reflective of the level of water within rear chamber 102. Indicator 108 is used to indicate clogging in filter 100 as the water level rises in rear chamber 102 due to impurities, debris, etc. slowing the flow through the filter medium. Indicator 108 comprises a transparent, vertical tube 110 and float 112 positioned within tube 110. Slot 118 is provided in indicator 108 to allow water to flow into tube 110 from rear chamber 102. Any sized opening, however, that allows water to enter and reflect the water level of rear chamber 102 may also be used. Provided on tube 110 are lower and upper indicating lines 114 and 116, respectively; however, any number of lines may be used. Indicating lines 114 and 116 visually display the level of water within tube 110 and within filter 100. Lower indicating line 114 is a mark for indicating normal operation, while upper indicating line 116 acts as a warning mark, as discussed below.

Figure 2A:
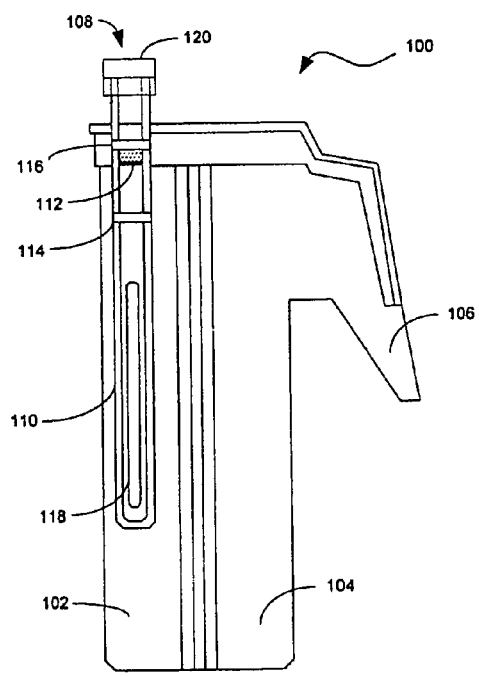
FIG. 2a illustrates a side view of a filter with the indicating device during clogging.
Figure 2B:
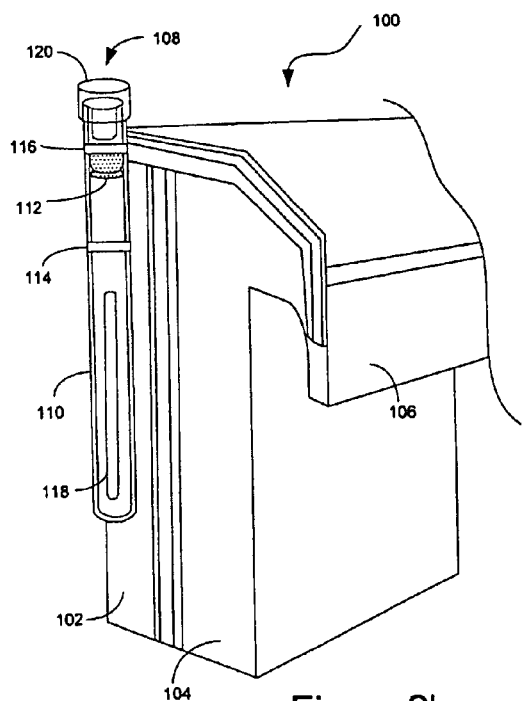
FIG. 2b illustrates a perspective view of a filter with the indicating device during clogging.

During normal operation, as shown in FIGS. 1*a* and 1*b*, float 112 sits in tube 110 near lower indicating line 114 indicating filter 100 is working properly and is not blocked or clogged. However, FIGS. 2*a* and 2*b* illustrate the indication that the water level is rising due to blocking or clogging. As float 112 rises towards upper indication line 116, or warning mark, it indicates to the user that the filter is becoming blocked or clogged and needs, or will soon need, changing.

CONCLUSION

A system and method has been shown in the above embodiments for the effective implementation of a clog indicating device on an aquarium filter. While various preferred embodiments have been shown and described, it will be understood that there is not intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques.

What is claimed is:

1. A clogging indicator in combination with a chambered aquarium filter, the combination comprising:
   the chambered aquarium filter comprising
      a first and second chamber, a filter element separating the chambers, the first chamber comprising a water level in the first chamber affected by a clogging of the filter element;
   the indicator comprising
      a tube in fluid communication with the first chamber, the tube mounted on—and substantially parallel to a plane of—an outside face of an exterior wall of the chambered aquarium filter,
      a float disposed in the tube, the float responsive to the water level,
      a reference marker relative to the float indicating a clogged state of the filter element inhibiting water flow from the first chamber into the second chamber.

2. The clogging indicator of claim 1, wherein the reference marker comprises a first mark and a second mark, the first mark indicating clear state of the filter element and the second mark indicating a clogged state of the filter element and wherein the float travels between the first and second mark to indicate the state of the filter element.

3. The clogging indicator of claim 1, wherein the tube and the first chamber are connected by a slot.

4. A clogging indicator in combination with a chambered aquarium filter, the combination comprising:
   the chambered aquarium filter comprising
      a first and second chamber, a filter element separating at least two chambers, at least one chamber comprising a water level affected by a clogging of the filter element;
   the indicator being mounted on—and substantially parallel to a plane of—an outside face of an exterior wall of the chambered aquarium filter and comprising
      a float responsive to a water level in the at least one chamber for the aquarium filter, the water level being affected by clogging of the filter element, the float traveling between a first position and a second position, the first position indicating a clear state of the filter element and the second position indicating a clogged state of the filter element.

5. The clogging indicator of claim 4, wherein the indicator comprises a vertical tube, the tube housing the float.

6. The clogging indicator of claim 5, wherein the vertical tube comprises a first marker corresponding to the first position and a second marker corresponding to the second position.

7. The clogging indicator of claim 4, wherein the indicator and the at least one chamber are connected by a slot.

\* \* \* \* \*